Feb. 18, 1964    J. A. TOEDTMAN    3,121,601
HOT LINE CLAMP

Filed Jan. 3, 1961    3 Sheets-Sheet 1

INVENTOR
JOHN A. TOEDTMAN
BY
Cohn and Powell
ATTORNEYS

Feb. 18, 1964 J. A. TOEDTMAN 3,121,601
HOT LINE CLAMP

Filed Jan. 3, 1961 3 Sheets-Sheet 2

INVENTOR
JOHN A. TOEDTMAN
BY *Cohn and Powell*
ATTORNEYS

Feb. 18, 1964 J. A. TOEDTMAN 3,121,601
HOT LINE CLAMP

Filed Jan. 3, 1961 3 Sheets-Sheet 3

INVENTOR
JOHN A. TOEDTMAN
BY *Cohn and Powell*

ATTORNEYS

United States Patent Office 3,121,601
Patented Feb. 18, 1964

3,121,601
HOT LINE CLAMP
John A. Toedtman, Warson Woods, Mo., assignor to Jasper Blackburn Corporation, St. Louis, Mo., a corporation of Missouri
Filed Jan. 3, 1961, Ser. No. 80,458
7 Claims. (Cl. 339—265)

This invention relates generally to improvements in a hot line clamp, and more particularly to improvements in a device of this type adapted to connect a main wire selectively to any size tap wire under pressure conditions most favorable to each wire.

In the heretofore conventional type of two bolt clamps, the same pressure that is exerted on the main wire is in general exerted on the tap wire, assuming that the bolts are tightened evenly. This condition results in too little pressure on the main wire to maintain an effective and rigid connection, and results in too much pressure on the tap wire, particularly on small tap wires, when the clamp is tightened. Because the tap wire is usually smaller than the main wire, the excessive pressure on the tap wire can cause mutilation or deformation that could adversely affect the electrical connection.

It is a major objective of the present invention to provide a hot line clamp that is capable of accommodating either a small or a large tap wire, and when accommodating the small tap wire, exert a lesser pressure on the tap wire than on the main wire, and yet exert sufficient pressure on each wire for a rigid electrical connection without damage to either of such wires.

An important object is achieved by the provision of a fulcrum member interconnecting a pair of clamp sections between which the tap wire is located and held. A pair of spaced independent tap grooves are provided, one being larger than the other. The larger tap groove is located between the pair of clamping bolts, as is the fulcrum member, while the smaller tap groove is located outside of one of such bolts. When the bolts are tightened evenly, the structural arrangement is such that less than half of the clamping force will be exerted on the smaller tap wire than will be exerted on the main wire that is retained by the clamp between the bolts.

When a tap wire is located in the smaller tap groove, the tightening forces are supported in part by the tap wire and in part by the fulcrum member. Because of the particular relationship and position of the smaller tap groove and fulcrum member with respect to the clamping bolts, the greatest portion of the tightening forces is supported by the fulcrum member.

Another important object is afforded by the provision of means for clamping the tap wire in place prior to installation of the device on the main wire, thereby facilitating the location and tightening of the clamp on the main wire and creating more advantageous and safe conditions.

Still another important object is realized by constructing a clamp of three superimposed sections, the lower and middle sections being formed to provide a pair of spaced tap grooves, one larger than the other, and the middle and upper sections being formed to provide a main groove aligned directly above the larger tap groove. Fastening means on opposite sides of the larger tap groove and on opposite sides of the main groove interconnect the sections and serve to clamp the sections together. A fulcrum member operatively interconnects the lower and middle sections and is located between the fastening means so that a reduced pressure is exerted on a tap wire held in the smaller tap groove while full pressure is exerted on the main wire held in the main groove, when the sections are clamped.

The advantages and functional results described above are obtained by locating the smaller tap groove on the outside of one of the bolts interconnecting the clamp sections, while the fulcrum member is located between the pair of bolts, and by locating the main groove between such bolts also. This structural arrangement regulates the amount of pressure on both the smaller tap wire and main wire upon tightening of the bolts.

Yet another important object is to provide a hot line clamp that is simple and durable in construction, economical to manufacture and assemble, efficient in operation, and which can be readily utilized by any one with only a minimum of instruction.

The foregoing and numerous other objects and advantages of the invention will more clearly appear from the following detailed description of a preferred embodiment, particularly when considered in connection with the accompanying drawings, in which.

Figure 1:
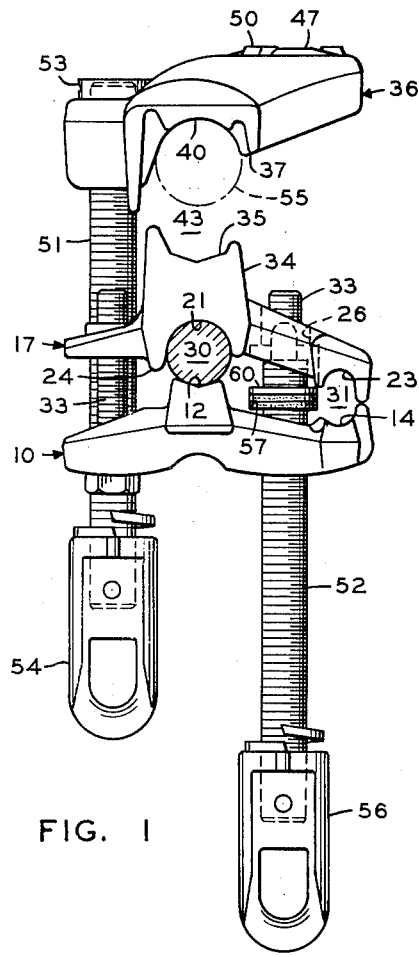
FIG. 1 is an end elevational view of the hot line clamp, illustrating the positioning of a tap wire in the larger tap groove.
Figure 2:
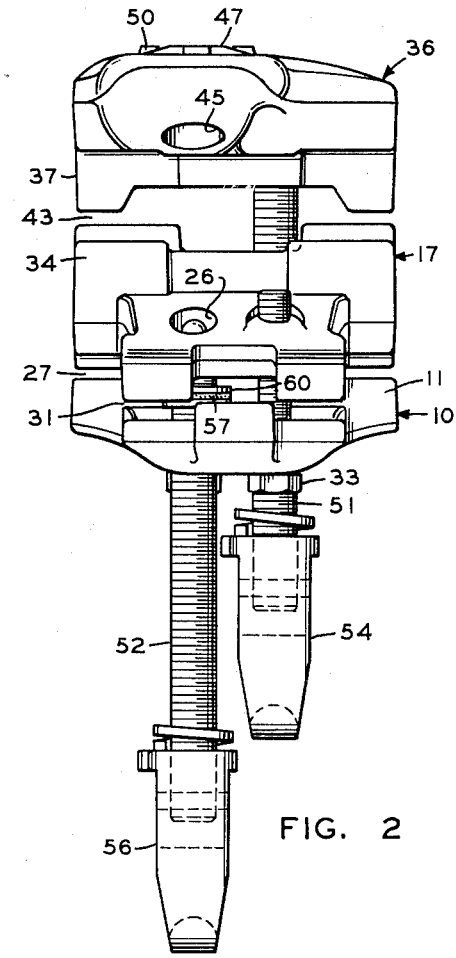
FIG. 2 is a side elevational view of the device as seen from the right of FIG. 1.

Referring now by characters of reference to the drawings, a hot line clamp is disclosed for connecting tap wires of various sizes to a main cable. The clamp includes three superimposed sections, one on top of the other, between which the main cable and a tap wire are retained. The clamp sections are formed of electrically conductive metal.

The lower section generally indicated at 10, and sometimes referred to as the body, is provided with an intermediate, upstanding formation 11 having a longitudinal groove 12 extending from one end of the lower section to the opposite end.

Another upstanding formation 13 is formed on lower section 10 in laterally spaced relation to the previously described formation 11. A longitudinal groove 14 is provided in this outboard formation 13 which extends from one end of lower section 10 to the opposite end. The groove 14 is arranged parallel to groove 12 and is smaller than groove 12 for reasons which will best appear upon subsequent detailed description of parts.

Figure 12:
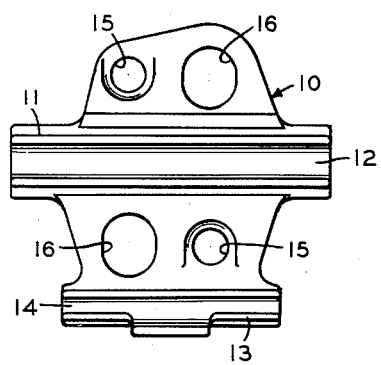
FIG. 12 is a top plan view of the lower clamp section.

From FIG. 12 it will be apparent that the lower section 10 is provided with a pair of screw holes 15 that are unthreaded. These screw holes 15 are located on opposite sides of the larger groove 12. One of the screw holes 15 is located between the larger groove 12 and the smaller groove 14.

Similarly, a pair of bolt apertures 16 are formed in lower section 10 on opposite sides of the larger groove 12. For reasons which will later appear, these bolt apertures 16 are unthreaded. One of the bolt apertures 16 is located between the larger groove 12 and the smaller groove 14.

The pair of screw holes 15 are relatively offset along the longitudinal axes of the grooves 12 and 14. In other words, the screw holes 15 are diagonally positioned. Similarly, the bolt apertures 16 are longitudinally offset and diagonally positioned. Each screw hole 15 and bolt aperture 16 on one side of the larger groove 12 is located directly opposite a bolt aperture and screw hole respectively on the opposite side of groove 12.

The middle section generally indicated at 17 is sometimes referred to as a spacer. Depending from the lower face of middle section 17 is a formation 20 in which a longitudinal groove 21 is formed. The groove 21 extends longitudinally from one end of the middle section 17 to the opposite end. The groove 21 is slightly wider than coacting formation 11 on the lower section 10 so that the upstanding formation 11 on the lower section 10 interfits within the groove 21 when the sections 10 and 17 are clamped together.

Another depending formation 22 is formed at one side of the middle section 17, in which a longitudinal groove 23 extends from one end of the middle section 17 to the other end. The groove 23 is arranged parallel yet spaced from the centrally located groove 21, and is of smaller dimension.

The width of formation 13 of the lower section 10 is smaller than the width of the groove 23 formed in formation 22 of the middle section 17. This constructional feature permits the formation 13 of lower section 10 to interfit with the groove 23 of middle section 17 when the sections are clamped together.

The formation 20 of middle section 17 includes a depending lip along one side of groove 21 which constitutes a fulcrum member 24. Under certain conditions which will be later described, the fulcrum member 24 engages the lower section 10 and causes an adjustment of pressures on various wires retained by the clamp. Of course, it will be readily apparent that the fulcrum member 24 could be formed on the lower section 10 if desired and engage the middle section 17. In either case, the fulcrum member is between the lower and middle sections 10 and 17.

Formed through middle section 17 on opposite sides of the larger groove 21 are a pair of screw holes 25 which are threaded. One of the screw holes 25 is located between the grooves 21 and 23.

A pair of bolt apertures 26 are formed through the middle section 17 and are disposed on opposite sides of the groove 21. One of the bolt apertures 26 is located between the grooves 21 and 23. The bolt apertures 26 are unthreaded.

When assembled, the screw holes 15 of lower section 10 are aligned directly below the corresponding screw holes 25 formed in middle section 17, whereby to align the corresponding larger grooves 12 and 21 and the corresponding smaller grooves 14 and 23. In addition, the bolt apertures 16 are aligned directly below the corresponding bolt apertures 26 formed in the middle section 17.

The coacting larger grooves 12 and 21 constitute a tap groove 27 (FIG. 7) which is adapted to receive a large tap wire 30 as is illustrated in FIG. 1.

Figure 7:
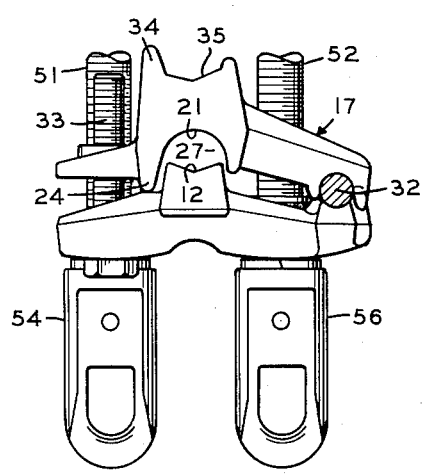
FIG. 7 is an end elevational view, illustrating the connection of a tap wire in the smaller tap groove.
Figure 3:
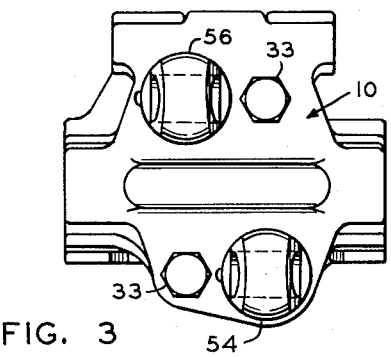
FIG. 3 is a bottom plan view of the device as seen from FIG. 2.
Figure 4:
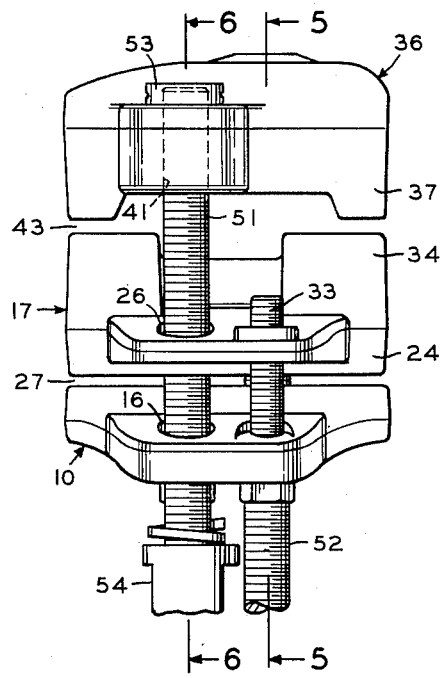
FIG. 4 is a fragmentary, side elevational view as seen from the left of FIG. 1.
Figure 5:
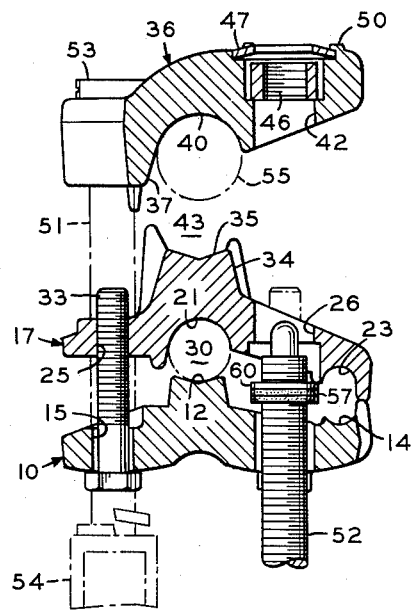
FIG. 5 is a cross sectional view as seen along line 5—5 of FIG. 4.

The coacting smaller grooves 14 and 23 provide a smaller tap groove 31 (FIG. 1) adapted to receive a smaller tap wire 32 as is best illustrated in FIG. 7.

Provision is made in this clamp for securing the lower and middle sections 10 and 17 together, whereby to hold a tap wire therebetween, prior to installation of the clamp on the main cable. Extending upwardly through the unthreaded screw holes 15 in lower section 10 and threadedly connected in the threaded screw holes 25 in the middle section 17, are a pair of screws 33.

In assemblying this unit, the tap wire is located between the lower and middle sections 10 and 17 and is located in the appropriate tap groove 27 or 31 depending upon the size of the tap wire. It will be assumed for purposes of illustration that a large tap wire is utilized under this condition, the larger tap wire 30 is located in the larger tap groove 27. Then, the screws 33 are extended upwardly through the aligned screw holes 15 and 25, and threadedly tightened. The screws 33 clamp the lower and middle sections 10 and 17 together and clamp the larger tap wire 30 securely therebetween in the larger tap groove 27.

The upper face of the middle section 17 is provided with an upstanding formation 34 having an upwardly facing groove 35 extending from end-to-end of the middle section 17 between the pairs of screw holes 25 and bolt apertures 26. Preferably, the upward facing groove 35 is aligned directly above the downwardly facing groove 21 formed in the bottom face of the middle section 17.

The upper section generally indicated at 36 is provided with a depending formation 37 on its lower face in which a longitudinal groove 40 is formed. The formation 37 on the upper section 36 is larger than the upstanding formation 34 on the middle section 17 so that such formation interfits when the middle section 17 and the upper section 36 are clamped together. The groove 40 in the upper section 36 extends from one end of such section to the other.

Figure 6:
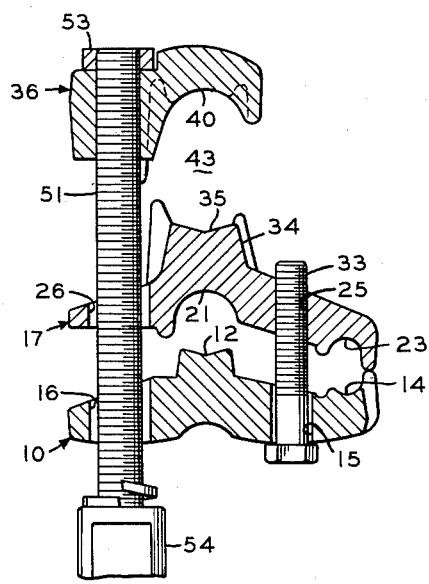
FIG. 6 is a cross sectional view as seen along line 6—6 of FIG. 4.

A pair of bolt apertures 41 and 42 are formed through the upper section 36 and are located on opposite sides of the groove 40. When assembled over the middle section 17, the bolt apertures 41 and 42 of the upper section 36 are aligned vertically with the corresponding bolt apertures 26 in middle section 17 and bolt apertures 16 in lower section 10. This arrangement of the middle section 17 and the upper section 36 brings the grooves 35 and 40 into direct alignment so that such grooves 35 and 40 constitute a main groove 43 (FIG. 6) into which a main wire 55 (FIG. 1) is located.

The bolt aperture 41 in upper section 36 is threaded. The area immediately adjacent the bolt aperture 41 on the top surface of the upper section 36 is recessed to provide a seat 44. The purpose of seat 44 will be later explained.

Figure 8:
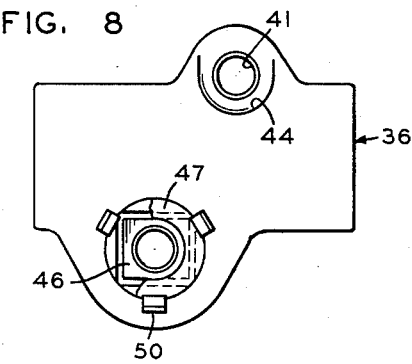
FIG. 8 is a top plan view of the upper clamp section.
Figure 9:
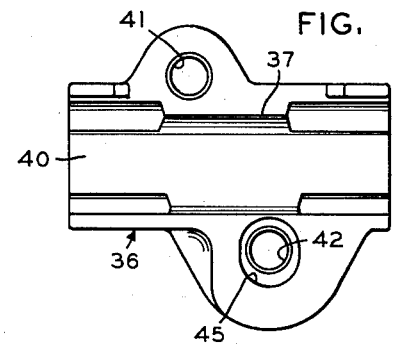
FIG. 9 is a bottom plan view of the upper clamp section.
Figure 10:
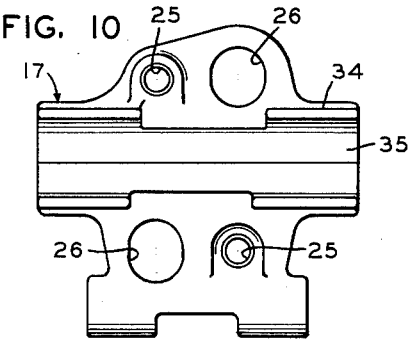
FIG. 10 is a top plan view of the middle clamp section.
Figure 11:
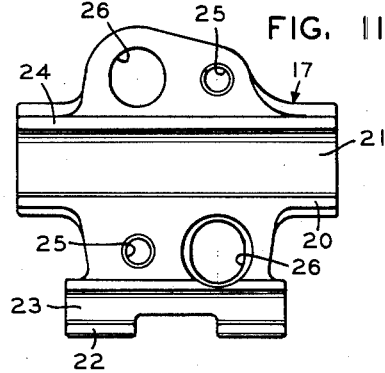
FIG. 11 is a bottom plan view of the middle clamp section.

The other bolt aperture 42 in upper section 36 is provided with a bell mouth opening 45 on its bottom face, as is best viewed in FIG. 9. The top face of upper section 36 is recessed in the region adjacent the bolt aperture 42 to receive and hold a threaded nut 46, best shown in FIG. 8. The nut 46 floats in this recess and is covered by an O-shaped disc 47. A plurality of tabs 50 formed on the upper section 36 are peened over the disc 47 and thereby retain the nut 46 in place.

A pair of threaded bolts 51 and 52 are utilized to clamp the three sections together. The one bolt 51 extends upwardly through the unthreaded bolt apertures 16 and 26 of the lower and middle sections respectively and is threadedly engaged in the threaded bolt aperture 41 of the upper section. A jamb nut 53 is threadedly attached and secured to the end of bolt 51 and is adapted to rest on the seat 44 when the upper section 36 is moved to its outwardmost position on bolt 51. The bottom end of bolt 51 is secured to an eye member. The other sections 10 and 17 are freely slidable longitudinally on such bolt 51.

The other bolt 52 extends upwardly through the unthreaded bolt apertures 16 and 26 formed in the lower section 10 and middle section 17 and located between the larger and smaller tap grooves 26 and 31. The bolt 52 is adapted to extend upwardly into the bell mouth 45 of the bolt aperture 42 and adapted to engage the floating threaded nut 46. To facilitate the threading of bolt 52, the lower end of the bolt is secured to an eye member 56.

Press-fitted over the threads of bolt 52 are a pair of washers 57 composed of a resilient material such as rubber. Also disposed over the bolt 52 and located immediately adjacent the upper side of washers 57 is a one-way retaining ring 60. The washers 57 and ring 60 are located between the lower section 10 and the middle section 17.

The one-way retaining ring 60 permits the bolt 52 to be moved freely in an upward direction through the bolt apertures 16 and 26 in which it is received until the upper end of the bolt 52 engages the floating threaded nut 46. This movement of bolt 52 is accomplished merely by shoving the bolt 52 upwardly and does not require any threading action. After engagement with floating nut 46, the bolt 52 is then turned to engage such nut threadedly and thereby attach to the upper section 36.

However, the one-way retaining ring 60 requires that the bolt 52 be threadedly turned to lower the bolt even after disengagement from the floating nut 46. The resilient washers 57 seat on the top face of the lower section 10 as the nut 52 is turned and thereby lowered by its threads.

In its initial assembly, the lower section 10 and middle section 17 are slidably mounted on the bolt 51, while the upper section 36 is threadedly attached to the same bolt 51. The other bolt 52 is attached to the lower section 10 by the washers 57 and retaining ring 60 located between the lower and middle sections. Thus it is seen that the lower and middle sections 10 and 17 can be separated quite easily to permit the insertion of a tap wire into either of the tap grooves 27 or 31.

It is thought that the utilization and functional advantages of the clamp have become fully apparent from the foregoing detailed description of parts, but for completeness of disclosure, a brief description of the connection of such clamp to the main wire and to various sized tap wires will be set forth.

First, to condition the clamp, the upper section 36 is threaded to the outer end of bolt 51 so that the jamb nut 53 is pressed tightly on seat 44. The upper section 36 now turns with bolt 51. Then, the bolt 52 is threadedly loosened and lowered until its upper end just about clears the bolt aperture 26 in the middle section 17, as is shown in FIG. 1.

It will be assumed that it is desired to attach the larger tap wire 30 in place. The lower and middle sections 10 and 17 are relatively separated by sliding the middle section upwardly on bolt 51, and the larger tap wire 30 is inserted and positioned within the larger tap groove 27 between the bolts 51 and 52. The middle section 17 is lowered toward the lower section 10 to position the tap wire in place.

The operator clamps the larger tap wire 30 prior to installation on the main wire 55 by inserting the pair of screws 33 in the manner previously described between the lower and middle sections. These screws 33 are tightened evenly to clamp the lower and middle sections 10 and 17 together, and thereby rigidly secure the larger tap wire 30.

The user places an attachment tool in the eye member 54 of bolt 51, raises the clamp and inserts the main wire 55 in the open side between the middle section 17 and upper section 36, and positions the main wire in the main groove 43. The bolt 51 is then tightened until the upper section 36 is brought down far enough to secure the main wire 55 in place.

Then, the other bolt 52 is pushed upwardly, as permitted by the one-way retaining member 60 until it engages the floating nut 46. The bolts 51 and 52 are tightened evenly to clamp all of the clamp sections together. The full pressure exerted by the bolts 51 and 52 are supported directly by the main wire 55 and by the larger tap wire 30, whereby to hold each wire securely. Because the larger tap wire 30 is of sufficient size, the exertion of full pressure on the tap wire 30 is needed and desirable.

However, when utilizing a tap wire 1/0 ACSR and smaller, the exertion of this full pressure by the bolts 51 and 52 on the smaller tap wire is harmful in that it frequently causes damage to the wire. When the smaller tap wire 32 is used, such wire is located in the smaller tap groove 31 on the outboard side of the clamp as is shown in FIG. 7 instead of being carried in the intermediate larger tap groove 27.

Of course, the smaller tap wire 32 is inserted between the lower section 10 and middle section 17 in the same manner as described previously with respect to the larger tap wire 30 above. After the smaller tap wire 32 is located in the outboard smaller tap groove 31, the screws 33 are inserted between the lower and middle sections 10 and 17 and then tightened. As the screws 33 are tightened, the fulcrum member 24 depending from middle section 17 engages the top surface of lower section 10. It is seen that if the screws 33 are tightened evenly, slightly more than half of the pressure exerted by the screws 33 is transmitted directly to and supported by the fulcrum member 24. In other words, slightly less than half of the force exerted by the screws 33 is transmitted to the smaller tap wire 32 while retained in the outboard tap groove 31.

After the lower and middle sections are temporarily clamped together by screws 33, the clamp is installed on the main wire 55 as described previously and the bolt 52 is threadedly attached to the upper section 36. The bolts 51 and 52 are threadedly tightened evenly to clamp the three sections securely together.

The full pressure exerted by the clamping bolts 51 and 52 is transmitted directly to and is supported by the main wire 55 between the middle and upper sections 17 and 36. Because of the position and operation of the fulcrum member 24 that interconnects the lower and middle sections 10 and 17, less than half of the full pressure exerted by the clamping bolts 51 and 52 on the main wire 55 will be exerted and transmitted to the smaller tap wire 32 when the bolts 51 and 52 are tightened evenly. The action of the bolts 51 and 52 oppose each other directly on opposite sides of the fulcrum member 24.

The exertion of reduced pressure on the small tap wire 32 disposed in the outboard tap groove 31 prevents damage or mutilation to the small tap wire 32. However, through the particular arrangement of the component parts of the clamp, full pressure provided by the clamping bolts 51 and 52 is transmitted to and holds the main wire 55 at all times. Thus it is seen that the main wire 55 and the small tap wire 32 are retained by the clamp under the most advantageous conditions applicable to each wire.

Although the invention has been described by making detailed reference to a single preferred embodiment, such detail is to be understood in an instructive, rather than in any restrictive sense, many variants being possible within the scope of the claims hereunto appended.

I claim as my invention:

1. A hot line clamp comprising a lower section and a middle section arranged in adjacent face-to-face relation, said lower and middle sections being provided with a pair of spaced tap grooves therebetween, one of said grooves being larger than the other groove, an upper section disposed adjacent the opposite side of said middle section, said upper and middle sections being provided with a main groove therebetween adapted to receive a main wire, a fulcrum member on one of said lower and middle sections abutting the other of said lower and middle sections when a tap wire is located only in said smaller tap groove, but not when a tap wire is located in the larger tap groove, and fastening means clamping said sections together, the fulcrum member reducing pressure on the tap wire when located only in the smaller tap groove.

2. A hot line clamp comprising a lower section and a middle section arranged in adjacent face-to-face relation, said lower and middle sections being provided with a pair of spaced tap grooves, one of said tap grooves being larger than the other groove, an upper section disposed adjacent the opposite side of said middle section, said upper and middle sections being provided with a main groove therebetween adapted to receive a main wire, and fastening means located on opposite sides of the larger tap groove and said main groove adapted to clamp said sections together, and means on one of the lower and middle sections abutting the other of said lower and middle sections at one side of the larger tap groove between said sections to provide a fulcrum when a tap wire is located only in said smaller tap groove but not when a tap wire is located in the larger tap groove, whereby to reduce pressure on said tap wire located in the smaller tap groove while allowing full pressure on the main wire carried in the main groove upon tightening of the fastening means to clamp the sections together, substantially the same pressure being exerted on the main wire carried in the main groove and on the tap wire when disposed only in the larger tap groove.

3. A hot line clamp comprising three superimposed sections, means on said lower and middle sections providing a pair of spaced tap grooves between said lower and middle sections, one of said tap grooves being larger than the other, means interconnecting said lower and middle sections and adapted to clamp a tap wire selectively in one of said tap grooves, means on said middle and upper sections providing a main groove therebetween adapted to receive a main wire, said main groove being disposed directly above said larger tap grove, fastening means on each side of said larger tap groove and said main groove clamping said sections together, and a fulcrum member on one of the lower and middle sections abutting the other of said lower and middle sections when a tap wire is disposed only in said smaller tap groove, the fulcrum member being located between the fastening means the fulcrum member and smaller tap groove being located on opposite sides of the main groove, said fulcrum member being adapted to reduce pressure on the tap wire carried in the smaller tap groove while allowing full pressure on the main wire carried in the main groove upon tightening of said fastening means to clamp the sections together.

4. A hot line clamp comprising three superimposed sections, means on said lower and middle sections providing a pair of spaced tap grooves therebetween, one of said tap grooves being larger than the other, means interconnecting said lower and middle sections and adapted to clamp a tap wire selectively in one of said tap grooves, means on said middle and upper sections providing a main groove therebetween adapted to receive a main wire, said main groove being disposed directly above said larger tap groove, bolt means on each side of said larger tap groove and said main groove clamping said sections together, the said bolt means on one side being located between the larger tap groove and the said smaller tap groove, and a fulcrum member on one of the lower and middle sections abutting the other of said lower and middle sections when a tap wire is disposed only in said smaller tap groove, the fulcrum member being located between the bolt means on the other side and the larger tap groove.

5. A hot line clamp comprising three superimposed sections, fastening means extending through said lower section and said middle section and attached to one side of said upper section, another fastening means extending through said lower section and said middle section and detachably secured to the other side of said upper section, means between the said lower and middle sections providing a pair of spaced tap grooves, one of said grooves being larger than the other, the larger tap groove extending between said fastening means, the smaller tap groove being disposed on the outside of one of said fastening means, a fulcrum member on one of said lower and middle sections abutting the other of said lower and middle sections and being disposed between the other of said fastening means and said larger tap groove, means between the middle and upper sections providing a main groove aligned above said larger tap groove and located between said fastening means, and means interconnecting said lower and middle sections to clamp said sections together selectively to hold a tap wire in one of said tap grooves prior to installation on the main wire, said fulcrum member reducing pressure on the tap wire carried in the smaller tap groove while allowing full pressure on the main wire carried in the main groove upon tightening of said fastening means to clamp the sections together.

6. A hot line clamp comprising three superimposed sections, a first bolt extending through said lower section and said middle section and threadedly attached to one side of said upper section, means carried by said first bolt holding said upper section on said first bolt, a second bolt extending through said lower section and said middle section and detachably secured to the other side of said upper section, means between the said lower and middle sections providing a pair of tap grooves, one of said tap grooves being larger than the other, the larger tap groove extending between said bolts, the smaller tap groove being disposed on the outside of said second bolt, a fulcrum member on one of said lower and middle sections abutting the other of said lower and middle sections and being disposed between said first bolt and the said larger tap groove, a pair of screws interconnecting said lower and middle sections to clamp said sections together selectively to hold a tap wire in one of said tap grooves prior to installation on the main wire, said screws being located on opposite sides of said larger tap groove, said bolts and said screws being arranged in diagonally opposed relationship, means between the middle and upper sections providing a main groove aligned above said larger tap groove, said main groove being adapted to receive a main wire upon disconnection of said second bolt, said fulcrum member reducing pressure on the tap wire carried in the smaller tap groove while allowing full pressure on the main wire carried in the main groove upon tightening of said bolts to clamp the sections together.

7. A hot line clamp comprising three superimposed sections, means on said lower and middle sections providing a pair of spaced tap grooves therebetween, one of said tap grooves being larger than the other, means on said middle and upper sections providing a main groove therebetween adapted to receive a main wire, fastening means on each side of said main groove and interconnecting said sections for clamping said sections together, the smaller tap groove being located on the outside of said fastening means, and a fulcrum member on one of said lower and middle sections abutting the other of said lower and middle sections when a tap wire is disposed in said smaller tap groove but not when a tap wire is located on said larger tap groove, the fulcrum member being located between said fastening means, said fulcrum member reducing pressure on the tap wire carried in the smaller tap groove while allowing full pressure on the main wire carried in the main groove upon tightening of said fastening means to clamp the sections together.

References Cited in the file of this patent

UNITED STATES PATENTS

| | | |
|---|---|---|
| 812,287 | Nagel | Feb. 13, 1906 |
| 1,699,211 | Rose | Jan. 15, 1929 |
| 2,077,613 | Bondeson | Apr. 20, 1937 |
| 2,159,154 | Hixon | May 23, 1939 |
| 2,948,878 | Toedtman | Aug. 9, 1960 |

FOREIGN PATENTS

| | | |
|---|---|---|
| 964,114 | France | Jan. 18, 1950 |
| 1,050,851 | Germany | Feb. 19, 1959 |
| 477,880 | Italy | Feb. 10, 1953 |